(12) United States Patent
Roeder et al.

(10) Patent No.: US 11,400,801 B2
(45) Date of Patent: Aug. 2, 2022

(54) SHADING BLIND FOR A ROOF WINDOW OF A MOTOR VEHICLE

(71) Applicant: Roof Systems Germany GmbH, Dietzenbach (DE)

(72) Inventors: Joachim Roeder, Muehlheim (DE); Thomas Becher, Rodgau (DE); Christian Biewer, Munster (DE); Franz Adelmann, Offenbach (DE)

(73) Assignee: Roof Systems Germany GmbH, Dietzenbach (DE)

( * ) Notice: Subject to any disclaimer, the term of this patent is extended or adjusted under 35 U.S.C. 154(b) by 946 days.

(21) Appl. No.: 16/177,343

(22) Filed: Oct. 31, 2018

(65) Prior Publication Data
US 2019/0135089 A1    May 9, 2019

(30) Foreign Application Priority Data

Nov. 3, 2017    (DE) ...................... 10 2017 125 721.7

(51) Int. Cl.
*B60J 7/00*    (2006.01)
*B60J 1/20*    (2006.01)

(52) U.S. Cl.
CPC ........... *B60J 7/0015* (2013.01); *B60J 1/2038* (2013.01); *B60J 1/2033* (2013.01); *B60J 1/2052* (2013.01); *B60J 1/2061* (2013.01); *B60J 1/2086* (2013.01)

(58) Field of Classification Search
CPC ...... B60J 7/0023; B60J 7/0015; B60J 1/2038; B60J 1/2013; B60J 1/2063
USPC ............... 296/214, 97.8; 160/DIG. 2, DIG. 3
See application file for complete search history.

(56) References Cited

U.S. PATENT DOCUMENTS

| | | | |
|---|---|---|---|
| 8,002,341 B2 * | 8/2011 | Hotta | B60J 7/0015 296/214 |
| 2003/0146650 A1 | 8/2003 | Paul et al. | |
| 2004/0251713 A1 * | 12/2004 | Nania | B60J 1/1815 296/146.15 |
| 2005/0280289 A1 * | 12/2005 | Wilms | B60R 13/0231 296/214 |

(Continued)

FOREIGN PATENT DOCUMENTS

| | | | | |
|---|---|---|---|---|
| DE | 102009040766 A1 * | 3/2011 | ............ | B60J 7/0023 |
| DE | 102009040766 A1 | 3/2011 | | |
| DE | 102017129328 A1 * | 6/2019 | ............ | B60J 1/2061 |

(Continued)

*Primary Examiner* — Jason S Morrow
*Assistant Examiner* — Wenwei Zhou
(74) *Attorney, Agent, or Firm* — Dilworth IP, LLC

(57) ABSTRACT

A shading blind for a roof window of a motor vehicle having two guide rails, a roller blind element which has two lateral, flexible guide structures with which it is guided in the guide rails, and a receiving space for the roller blind element, the roller blind element being adjustable between an extended position in which it is largely located outside the receiving space, and a retracted position in which it is largely located in the receiving space, wherein the receiving space has a length which is approximately half of the adjustment path between the extended and the retracted positions, the height of the receiving space is such that when the roller blind element is deflected in the receiving space by approximately 180°, the guide structures are only elastically deformed and a rear edge of the roller blind element is permanently attached in the receiving space.

18 Claims, 2 Drawing Sheets

(56) References Cited

U.S. PATENT DOCUMENTS

2008/0179021 A1* 7/2008 Biewer .................. B60J 7/0007
　　　　　　　　　　　　　　　　　　　　　　　　　160/243
2008/0272612 A1* 11/2008 Harnischfeger ....... B60J 7/0015
　　　　　　　　　　　　　　　　　　　　　　　　　296/97.9

FOREIGN PATENT DOCUMENTS

| FR | 2740823 A1 * | 5/1997 | ............ B60J 1/2011 |
| WO | 9000986 A1 | 2/1990 | |

* cited by examiner

SHADING BLIND FOR A ROOF WINDOW OF A MOTOR VEHICLE

CROSS REFERENCE TO RELATED APPLICATIONS

This application claims priority under 35 U.S.C. § 119 to the following German Patent Application No. DE 10 2017 125 721.7, filed on Nov. 3, 2017, the entire contents of which are incorporated herein by reference thereto.

BACKGROUND

The invention concerns a shading blind for a roof window of a motor vehicle, comprising two guide rails, a roller blind element having two lateral flexible guide structures with which it is guided in the guide rails, and a receiving space for the roller blind element, the roller blind element being adjustable between an extended position in which it is largely outside the receiving space and a retracted position in which it is largely in the receiving space.

Known shading blinds for roof windows of motor vehicles typically have a shaft on which the roller blind element of the shading blind is wound when it is opened. For this purpose, the roller blind element requires a receiving space which has a relatively large extension in the direction of the vehicle height, thus reducing the headroom of the occupants of the motor vehicle.

Furthermore, additional springs are required for such shading blinds, which reliably ensure that the fabric is rolled up onto the shaft. It is irrelevant in this regard whether the roller blind element is adjusted manually or electrically. These springs cause additional costs and increased assembly effort.

The task of the invention is therefore to provide a shading blind in which the disadvantages from the state of the art are improved.

BRIEF SUMMARY

The task is solved by the invention of a shading blind of the type mentioned above, in which the receiving space, measured in the direction of adjustment of the roller blind element, has a length which is approximately half of the adjustment distance between the extended and the retracted position, the height of the receiving space, measured perpendicularly to the plane of the roller blind element located between the guide rails, is such that, when the roller blind element is deflected in the receiving space by about 180°, the guide structures are only elastically deformed and a rear edge of the roller blind element is fixed in the receiving space. The extended and retracted position of the roller blind element corresponds to its closed or open position. The basic idea of the invention is to hold the roller blind element "in two layers" in the receiving space (and no longer, as in the state of the art, in several layers wound on top of each other), so that less space is required in the vertical direction. This is made possible by the finding that there is a comparatively large amount of space available in the longitudinal direction which can be used to accommodate the roller blind element without this being detrimental to the occupants of the vehicle. A minimum height of the receiving space results from the elasticity of the flexible guide structures, as these are elastically deformable only up to a certain radius of curvature. For example, the minimum radius of curvature (measured in relation to the center of curvature on the outside of the guide structures) is 7 mm, resulting in a minimum height of 14 mm of the receiving space. Preferably, the height of the receiving space is in the same magnitude as the minimum height, but it can also be greater than the minimum height. In particular, the receiving space is provided in the area of the rear seats of the motor vehicle, which increases the headroom of the occupants in the rear seats. A further advantage of the shading blind according to the invention is that no springs are necessary any more in order to reliably hold the roller blind element in the receiving space when it is moved back to the retracted position. This saves costs and reduces the assembly effort. By fixing the rear edge of the roller blind element, i.e. the edge that is always in the receiving space, there is a pre-defined way in which the roller blind element is "folded" into the receiving area.

The receiving space preferably has a lower shell and an upper shell, between which an inlet opening for the roller blind element is provided on one side, in particular the lower shell and the upper shell being firmly connected to one another on the opposite side. Furthermore, the lower shell and the upper shell each extend essentially over the entire length of the receiving space. The roller blind element can be displaced through the inlet opening between the extended position and the retracted position, whereby in the retracted position the roller blind element is largely located between the lower shell and the upper shell. The lower shell can be a roof lining of the motor vehicle. All in all, the roller blind element is protected on all sides in this way when it is in the retracted position. A contour of the lower shell can be adapted to the installation space conditions of the motor vehicle, since a continuous flat extension of the lower shell is not necessary. For example, the lower shell can have a recess in which, for example, a lighting unit for the vehicle interior is accommodated.

One aspect is that the rear edge of the roller blind element is firmly connected to one of the walls of the receiving space, where it is deflected by at least 180°. In the following, "firmly connected" means that the roller blind element is fixed to the wall at least in sections relative to the wall, for example by welding or gluing. The roller blind element can also only be firmly connected to the wall in the area of the flexible guide structures. For example, a first leg of the roller blind element extends a certain distance into the receiving space from its end fixed to the wall, the leg being connected by a C-shaped section to a second leg extending in the opposite direction from the C-shaped section to the first leg. In other words, the roller blind element is U-shaped in the receiving space, with one leg of the roller blind element firmly attached to the wall. The height required for the shading blind in this embodiment of the invention is particularly low in the vertical direction, since only two layers of the roller blind element are accommodated in the receiving space. Essentially, the installation space in the vertical direction is limited only by a material-related minimum height (e.g. flexibility of the material of the roller blind element, in particular the guide structures) of the C-shaped section. Due to the fixed connection to the receiving space, it is geometrically predetermined in which way the roller blind element is placed in the receiving space when it is inserted there. It also ensures that the roller blind element cannot be pulled out excessively.

According to another aspect, the lower shell forms a wall of the receiving space and the roller blind element is firmly connected to the lower shell at its front edge. The front edge is preferably assigned to the inlet opening so that the roller blind element extends U-shaped between the front edge of the lower shell and the inlet opening. This means that the entire length of the receiving space is optimally used for mounting the roller blind element.

In one embodiment of the invention, a cross beam is provided in the receiving space with which the rear edge of the roller blind element is firmly connected, with the roller blind element being deflected by at least 180°. Preferably, the cross beam is provided in an area of the receiving space which is assigned to the inlet opening for the roller blind element. In particular, in this embodiment of the invention, the receiving space is limited on its underside by the headliner of the motor vehicle.

Preferably, the roller blind element is fixed near an inlet slot for the roller blind element. This means that the entire length of the receiving space is optimally used for receiving the roller blind element.

According to a further embodiment of the invention, a spring element is provided, which acts on a loop of the roller blind element located in the receiving space into the receiving space. The spring element acts on the roller blind element at least in its extended position in the direction of the retracted position, so that the roller blind element is tightly tensioned.

One aspect is that the guide rails extend into the receiving space and define a receiving path there. In particular, the receiving path consists of two sections and a 180° bend arranged between them. The roller blind element is therefore guided through the guide rails into the receiving space. The section of the guide rails which is provided in the receiving space is in particular designed in such a way that it limits an extension of the roller blind element, i.e. an adjustment towards the closed position. The flexible guide structures of the roller blind element may be fixed to the guide rails at one end of the receiving path which is, with respect to the course of the roller blind element, remote from the inlet opening for the roller blind element.

Another aspect is that the roller blind element is deflected by about 180° between the ends of the receiving path. If the receiving path consists of two sections and a 180° bend arranged between them, the roller blind element is deflected by approximately 180° particularly between the two sections, i.e. in the area of the 180° bend.

The guide structures are preferably plastic strips. Such plastic strips are particularly easy to attach to a fabric of the roller blind element, for example by welding or gluing.

One embodiment of the invention provides that the inlet opening for the roller blind element into the receiving space shall be above the floor of the receiving space.

BRIEF DESCRIPTION OF THE FIGURES

Further advantages and features of the invention can be gathered from the following description and the drawings to which reference is made. In these show.

DETAILED DESCRIPTION

Figure 1:
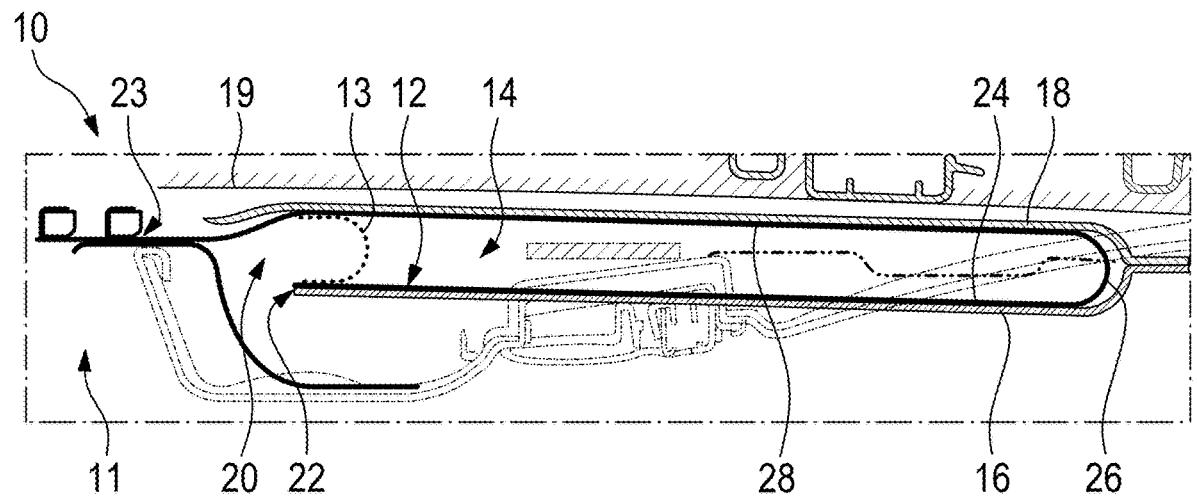
FIG. 1 a longitudinal section through a shading blind according to the invention in a retracted position.
Figure 2:
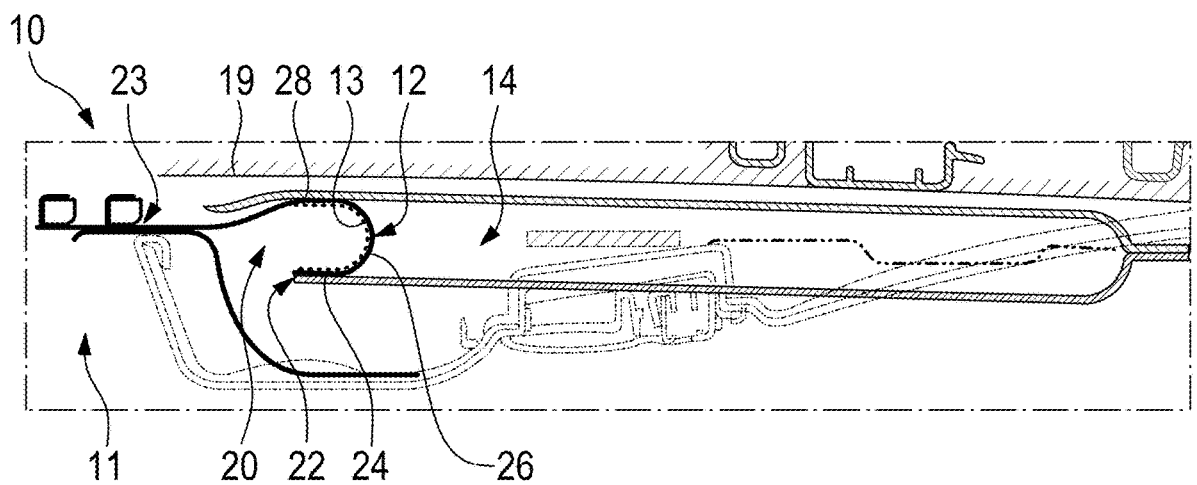
FIG. 2 the shading blind accordingly to the invention of FIG. 1 in an extended position.
Figure 3:
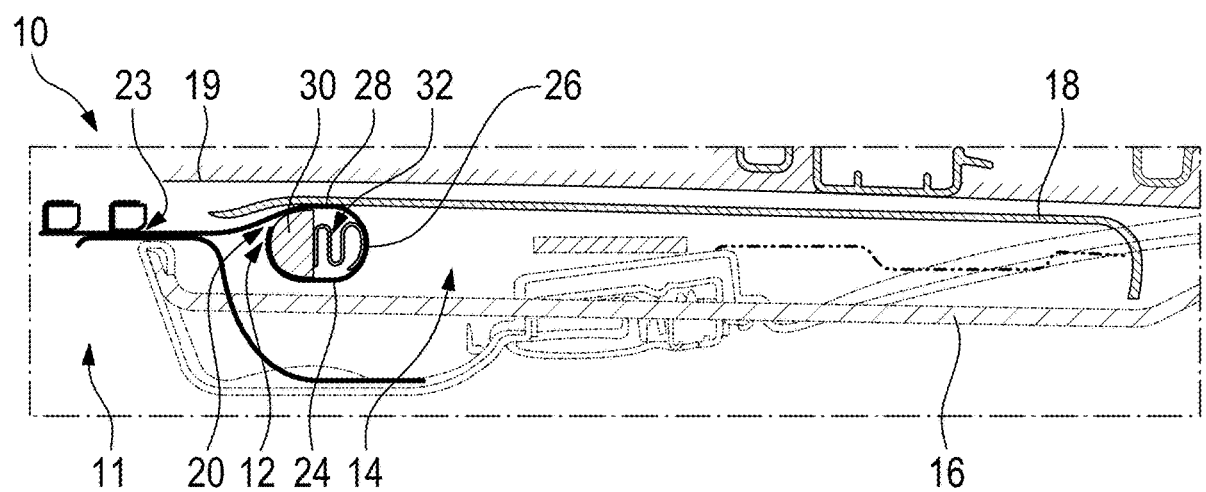
FIG. 3 an alternative variant of a shading blind according to the invention.

FIGS. 1 to 3 each show a longitudinal section through a portion of a shading blind 10 as used in roof openings of motor vehicles. The shading blind 10 is used to allow light and/or ambient air to enter at least partially through a roof opening into a vehicle interior 11 or to keep it at least partially away from this interior.

The shading blind 10 has a roller blind element 12 which is adjustable between a retracted position shown in FIG. 1 and an extended position shown in FIGS. 2 and 3.

The roller blind element 12 comprises a fabric web with flexible guide structures at its two lateral edges, each of which is, for example, a plastic strip. With these guide structures, the roller blind element 12 is guided in guide rails 13 at least in an area visible from the passenger compartment of the motor vehicle during adjustment between the extended and retracted positions.

Furthermore, the roller blind element 12 has a front edge (the edge which is visible to an occupant of the vehicle and on which a cross bar is usually provided) and a rear edge (the edge which is not visible to the occupant of the vehicle behind a headliner of the vehicle).

In the retracted position, which corresponds to the open position of the roller blind element 12, most of the roller blind element 12 is located in an elongated receiving space 14 of the shading blind 10. In this position, light and/or ambient air can enter the passenger compartment 11 of the vehicle. Elongated means that the height of the receiving space 14, measured perpendicular to the plane of the roller blind element 12 located between the guide rails (i.e. measured in the vehicle height direction), is substantially less than the length of the receiving space 14, measured in the direction of adjustment of the roller blind element 12.

A minimum height of the receiving space 14 is defined by the elasticity of the flexible guide structures since these are elastically deformable only up to a certain radius of curvature. For example, the minimum radius of curvature (measured in relation to the center of curvature outwards at the guide structures) is 7° mm. Accordingly, in this example the minimum height of the receiving space 14 is 14 mm. Preferably the height of the receiving space 14 is in the same magnitude as the minimum height, but it can also be larger than the minimum height.

Receiving space 14 is located on the roof at the motor vehicle, for example in an area of the rear seats.

In the extended position, which corresponds to the closed position of the roller blind element 12, most of the roller blind element 12 is located outside the receiving space 14 of the shading blind and at least partially covers the roof opening of the motor vehicle so that light and/or ambient air cannot enter the interior of the vehicle through the roof opening or can only enter the interior of the vehicle through the roof opening partially.

In the version of the shading blind 10 shown in FIGS. 1 and 2, the receiving space 14 has a lower shell 16 and an upper shell 18, which define the receiving space 14 on the underside and top respectively. The lower and upper shell 16, 18 thus form walls of the receiving space 14. The upper shell 18 can be attached to a roof structure 19 of the motor vehicle.

Between upper shell 18 and lower shell 16 there is an inlet opening 20 on one side in relation to the longitudinal direction of the vehicle, through which the roller blind element 12 can be displaced between the extended and the retracted position. The upper shell 18 and the lower shell 16 can be firmly connected to each other on one side opposite the inlet opening 20.

The rear edge of the roller blind element 12 is firmly attached to the lower shell 16 at a front edge 22 thereof. The front edge 22 is located near an entrance slot 23 through which the roller blind element 12 is guided into the passenger compartment 11, for example through a covering of the shading blind 10.

From the end firmly connected to the lower shell 16, a first leg 24 of the roller blind element 12 extends into the receiving space 14, i.e. runs away from the inlet opening 20.

A C-shaped loop 26 deflects the roller blind element 12 by at least 180°. A second leg 28, which adjoins the C-shaped loop 26, runs opposite to the first leg 24 in the direction of the inlet opening 20. The inlet opening 20 lies above the lower shell 16, which forms the bottom of the receiving space 14. The roller blind element 12 is therefore essentially U-shaped in the receiving space 14.

A length of the receiving space 14, measured in the direction of adjustment of the roller blind element 12 (i.e. essentially in the longitudinal direction of the vehicle), is about half the distance between the extended and the retracted positions of the roller blind element 12. Accordingly, the portion of the roller blind element 12 which is in the retracted position in the receiving space 14 is accommodated in the receiving space 14 with two layers lying vertically one above the other.

In order to limit the extension of the roller blind element 12 and/or to keep the roller blind element 12 tightly tensioned in the extended position, it may be provided that the guide rails 13 extend into the receiving space 14 (indicated by dotted lines in FIGS. 1 and 2). The portion of the guide rails 13 located in the receiving space 14 forms a receiving path for the roller blind element 12 and consists essentially of two sections, each extending parallel to the wall of the receiving space 14, and a 180° arc interposed therebetween. The flexible guide structures of the roller blind element 12 can be firmly connected to the guide rails 13 at one end of the receiving path remote from the inlet opening 20 with respect to the course of the roller blind element 12.

FIG. 3 shows an alternative embodiment of the shading blind 10, in which the lower shell 16 of the receiving space 14 is formed by the roof lining of the motor vehicle. In receiving space 14, or more precisely in an area of receiving space 14 assigned to the inlet opening 20, a cross bar 30 is also provided. The rear edge of the roller blind element 12 is fixed to the cross bar 30.

Analogous to the variant described above, the roller blind element 12 first extends from the cross bar 30 into the receiving space 14, is deflected by at least 180° via a loop 26 and then runs in the direction of an inlet opening 20, which in this variant is formed between upper shell 18 and cross bar 30.

A spring element 32 is attached to cross bar 30, which applies a force to loop 26 at least in a fully extended position of the roller blind element 12 towards the retracted position. This ensures, for example, that the fabric of the roller blind element 12 is tightly tensioned in the extended position.

The invention claimed is:

1. A shading blind for a roof window of a motor vehicle, having two guide rails, a roller blind element which has two lateral, flexible guide structures with which it is guided in the guide rails, and a receiving space for the roller blind element, the roller blind element being adjustable between an extended position in which it is largely located outside the receiving space, and a retracted position in which it is largely located in the receiving space, wherein the receiving space, measured in an adjustment direction of the roller blind element, has a length which is approximately half of an adjustment path between the extended and the retracted positions, a height of the receiving space, measured perpendicularly to a plane of the roller blind element located between the guide rails, is such that when the roller blind element is deflected in the receiving space by approximately 180°, the guide structures are only elastically deformed and a rear edge of the roller blind element is permanently attached in the receiving space, wherein a cross bar is provided in the receiving space, to which the rear edge of the roller blind element is firmly connected, the roller blind element deflected by at least 180°.

2. The shading blind according to claim 1, wherein the receiving space has a lower shell and an upper shell between which an inlet opening for the roller blind element is provided on one side, the lower shell and the upper shell being firmly connected to one another on an opposite side.

3. The shading blind according to claim 1, wherein the receiving space comprises walls, wherein the rear edge of the roller blind element is fixedly connected to one of the walls of the receiving space.

4. The shading blind according to claim 2, wherein the lower shell forms a wall of the receiving space and the roller blind element is firmly connected to the lower shell at a front edge of the lower shell.

5. The shading blind according to claim 3, wherein the roller blind element is fixed in a vicinity of an inlet opening for the roller blind element.

6. The shading blind according to claim 3, wherein a spring element is provided which acts biases on a loop of the roller blind element is located in the receiving space into the receiving space.

7. The shading blind according to claim 1, wherein the guide rails extend into the receiving space and define a receiving path there.

8. The shading blind according to claim 7, wherein the roller blind element is deflected by approximately 180° between ends of the receiving path.

9. The shading blind according to claim 1, wherein the guide structures are plastic strips.

10. The shading blind according to claim 1, wherein an inlet opening for the roller blind element into the receiving space lies above a floor of the receiving space.

11. The shading blind according to claim 2, wherein the receiving space comprises walls, wherein the rear edge of the roller blind element is fixedly connected to one of the walls of the receiving space.

12. The shading blind according to claim 11, wherein the lower shell forms a wall of the receiving space and the roller blind element is firmly connected to the lower shell at a front edge of the lower shell.

13. The shading blind according to claim 3, wherein a lower shell forms a wall of the receiving space and the roller blind element is firmly connected to the lower shell at a front edge of the lower shell.

14. The shading blind according to claim 4, wherein the roller blind element is fixed in a vicinity of an inlet opening for the roller blind element.

15. The shading blind according to claim 1, wherein the roller blind element is fixed in a vicinity of an inlet opening for the roller blind element.

16. The shading blind according to claim 12, wherein the roller blind element is fixed in a vicinity of an inlet opening for the roller blind element.

17. The shading blind according to claim 4, wherein a spring element is provided which acts biases on a loop of the roller blind element is located in the receiving space into the receiving space.

18. The shading blind according to claim 1, wherein a spring element is provided which acts biases on a loop of the roller blind element is located in the receiving space into the receiving space.

\* \* \* \* \*